United States Patent [19]
Coutant et al.

[11] Patent Number: 5,636,119
[45] Date of Patent: Jun. 3, 1997

[54] DOWNSTREAM RATE LIMITING METHOD IN TRANSMISSION CONTROL

[75] Inventors: Alan R. Coutant, Chillicothe; Sanjay Rajagopalan, Peoria, both of Ill.

[73] Assignee: Caterpillar Inc., Peoria, Ill.

[21] Appl. No.: 455,439

[22] Filed: May 31, 1995

[51] Int. Cl.[6] .............................. B60K 41/12; F16H 47/00
[52] U.S. Cl. .............................. 364/424; 477/68; 477/69; 475/78; 192/3.61; 192/3.62
[58] Field of Search .............................. 364/424.1, 426.04; 477/43, 46, 49, 68, 69, 39, 78, 107, 111, 135; 475/76, 78, 80, 83; 192/4 C, 3.61, 3.62, 3.63

[56] References Cited

U.S. PATENT DOCUMENTS

| | | | |
|---|---|---|---|
| 4,082,013 | 4/1978 | Dornfed et al. | 477/68 |
| 4,185,521 | 1/1980 | Beals | 477/69 |
| 4,497,223 | 2/1985 | Maruyama et al. | 364/424.1 |
| 4,653,006 | 3/1987 | Osanai et al. | 364/424.1 |
| 4,683,779 | 8/1987 | Osanai et al. | 477/111 |
| 5,447,029 | 9/1995 | Swick et al. | 60/442 |

*Primary Examiner*—Kevin J. Teska
*Assistant Examiner*—Tan Q. Nguyen
*Attorney, Agent, or Firm*—Calvin E. Glastetter

[57] ABSTRACT

A downstream rate limiting control is provided for controlling a continuously variable transmission. The rate limiting control monitors a input and a current machine state and computes the difference between these two inputs and compares the computed error to a predefined rate table to determine if the computed error should be limited or modified. The rate signal will modify the computed error within the control logic with respect to operator comfort and machine parameters.

2 Claims, 4 Drawing Sheets

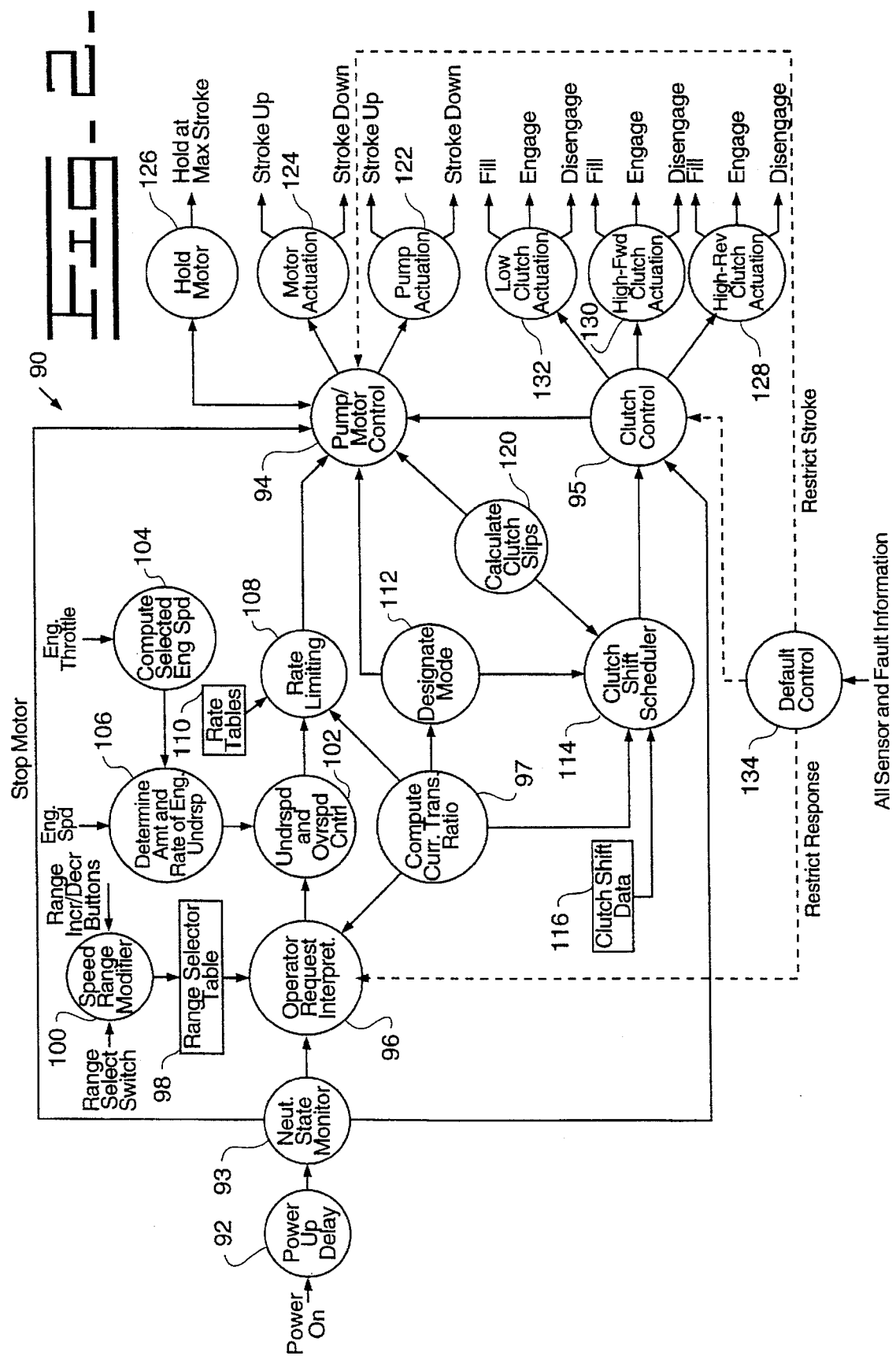

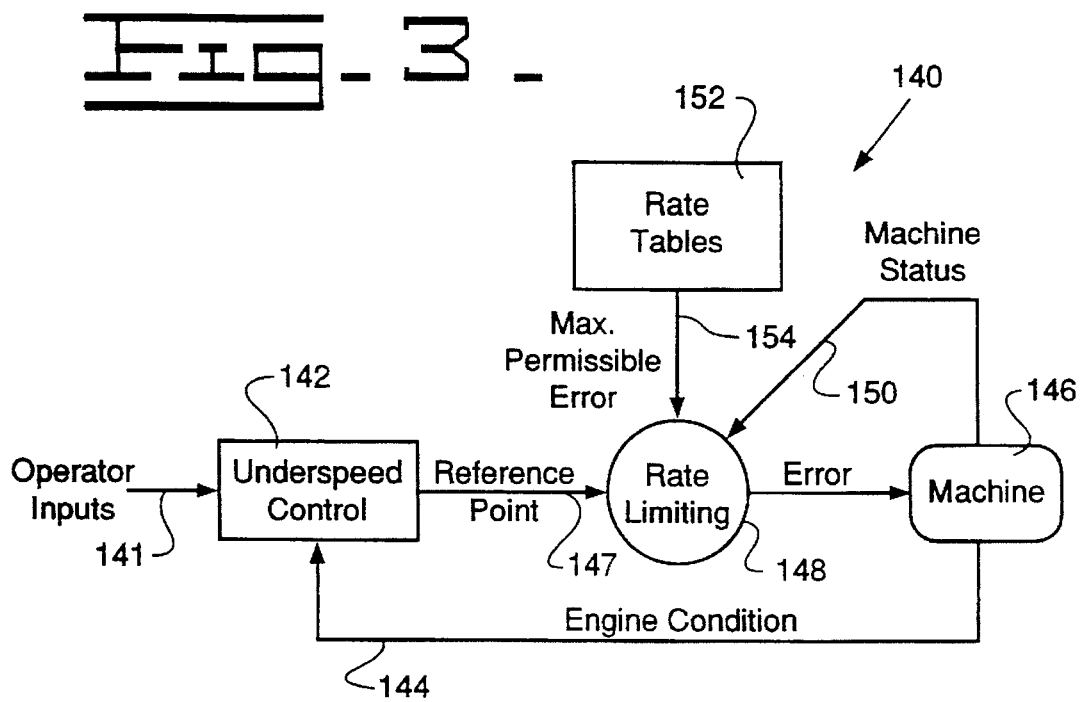
Fig-3-
Fig-4-
| RATE TABLES | | | | | |
|---|---|---|---|---|---|
| ACCELERATION | | | DECELERATION | | |
| Ser. No. | % Trans. Ratio | Max. Permissible Rate | Ser. No. | % Trans. Ratio | Max. Permissible Rate |
| 1 | $X_1$ | $Y_1$ | 1 | $A_1$ | $B_1$ |
| 2 | $X_2$ | $Y_2$ | 2 | $A_2$ | $B_2$ |
| 3 | $X_3$ | $Y_3$ | 3 | $A_3$ | $B_3$ |
| 4 | $X_4$ | $Y_4$ | 4 | $A_4$ | $B_4$ |
| 5 | $X_5$ | $Y_5$ | 5 | $A_5$ | $B_5$ |

DOWNSTREAM RATE LIMITING METHOD IN TRANSMISSION CONTROL

TECHNICAL FIELD

This invention relates generally to a transmission control and more particularly to a method for downstream rate limiting in a closed loop transmission control.

BACKGROUND ART

In known systems, the continuously variable transmission control does not have feedback to the system to modify the operator inputs. Consequently, it is usual to specify rate limits which restrict the rate of response from the speed pedal or the range selector. The rate control on the speed pedal and the range selector will restrict the rate of response of the entire machine. In an open loop system the rates have to be specified upon the operator inputs as there is no state sensing or feedback to the system. Many times it is desirable to have the error signal modified or changed within the control logic downstream of the operator inputs.

DISCLOSURE OF THE INVENTION

In one aspect of the present invention a method is provided for controlling a continuously variable transmission having a hydrostatic transmission and a mechanical transmission drivingly connected to an engine. The method includes the steps of monitoring the transmission input speed, the output speed of the hydrostatic transmission, the output speed of the mechanical transmission and monitoring the position of a speed pedal, the position of a range selector lever, the position of a directional control lever. The method further includes the steps of comparing the monitored speeds and the position of the speed pedal, the range lever, the directional lever and developing a pedal gain signal and a engine underspeed signal for controlling the continuously variable transmission, generating a reference point based upon the pedal gain signal and the engine underspeed signal to determine an unlimited error, comparing the unlimited error to a predefined rate table to determine a maximum permissible error and develope a rate limited error signal, and controlling the continuously variable transmission in response to the limited error signal.

The present invention provides a method which monitors various speeds, operator inputs and rate limits the continuously variable transmission downstream of the operator inputs in regard to operator comfort and machine parameters.

BRIEF DESCRIPTION OF THE DRAWINGS

FIG. 2 is a flow chart of the overall operation of the transmission controller according to the present invention.

FIG. 3 is a diagrammatic flow chart showing the rate limiting function.

FIG. 4 is a chart showing the rate tables.

BEST MODE FOR CARRYING OUT THE INVENTION

Figure 1:
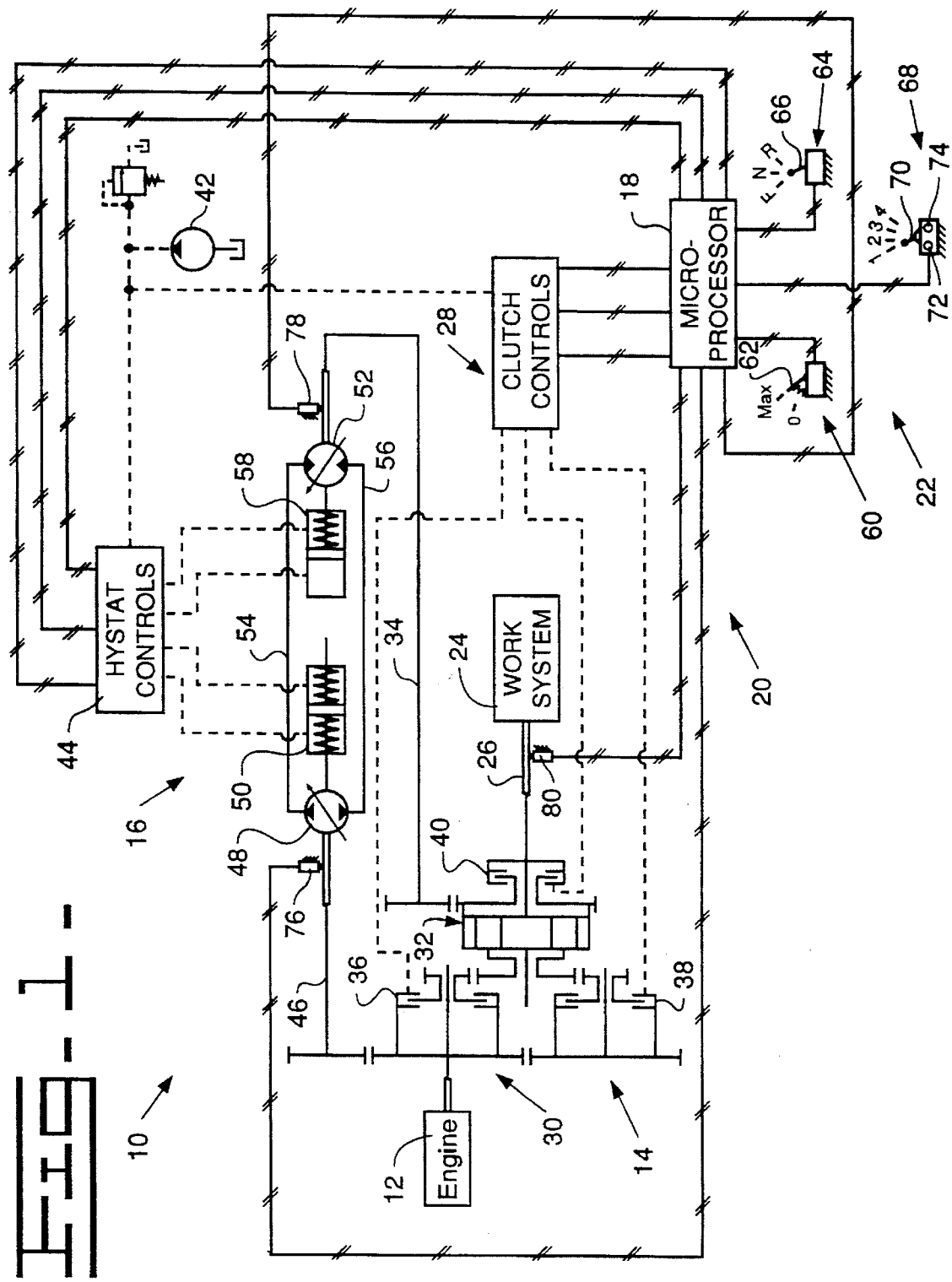
FIG. 1 is a diagrammatic illustration of a continuously variable transmission utilizing the subject invention.

A transmission system 10 is shown for use in a machine (not shown) having an engine 12. The continuously variable transmission system 10 includes a mechanical transmission 14, a hydrostatic transmission 16, a microprocessor 18, a sensing arrangement 20 and a command input arrangement 22. A work system 24 is connected to the continuously variable transmission 10 by a final drive shaft 26.

The mechanical transmission 14 and an associated clutch control arrangement 28 is operatively connected to the engine 12 through a gear arrangement 30. The mechanical transmission 14 includes a summing planetary arrangement 32 operatively connected to both the engine 12 through the gear arrangement 30 and to the hydrostatic transmission 16 through a motor output shaft 34. The output of the summing planetary arrangement 32 is connected to the final drive shaft 26. The mechanical transmission 14 also includes directional high speed clutches 36, 38 and a low speed clutch 40. The clutch control arrangement 28 is connected to a source of pressurized pilot fluid, such as a pilot pump 42 and the microprocessor 18 and is operative in response to electrical signals from the microprocessor 18 to control engagement and disengagement of the respective speed clutches 36, 38 and 40.

The hydrostatic transmission 16 and an associated hydrostatic control arrangement 44 is operatively connected to the engine 12 through a pump input drive shaft 46. The hydrostatic transmission 16 includes a variable displacement pump 48, a pump displacement controller 50, a variable displacement motor 52 fluidly connected to the variable displacement pump 48 by conduits 54, 56, and a motor displacement controller 58. The hydrostatic control arrangement 44 is connected to the pilot pump 42 and the microprocessor 18 and is operative in response to electrical signals from the microprocessor 18 to control movement of the respective pump and motor displacement controller 50, 58.

The command input arrangement 22 includes a speed input mechanism 60 having a speed pedal 62 moveable from a maximum speed position to a zero speed position, a direction control mechanism 64 having a direction control lever 66 selectively moveable from a neutral position to a forward or a reverse position, and a speed range control mechanism 68 having a speed lever 70 selectively moveable between a first position and a fourth position. A range increment button 72 and a range decrement button 74 are provided to modify the maximum allowable speed in each range.

The sensing arrangement 20 includes a first speed sensor 76 operative to sense the speed of the pump input shaft 46 and direct an electrical signal representative thereof to the microprocessor 18. A second speed sensor 78 is operative to sense the speed of the motor output shaft 34 and direct an electrical signal representative thereof to the microprocessor 18. A third speed sensor 80 is operative to sense the speed of the final output drive shaft 26 and direct an electrical signal representative thereof to the microprocessor 18.

Referring to FIGS. 1 and 2, the methodology of the transmission control within the microprocessor 18 is shown at 90. When the key of the machine is turned on, powerup delay of the transmission control 90 occurs in module 92. At this stage power is received from the start switch but activation of the transmission is delayed until the low-level hardware self test comes up error free. If an error were detected, the startup procedure would be suspended, and the operator would be required to turn off the power switch before normal operation is again possible. If no error is detected powerup state can be achieved even if the direction control lever 66 is not at the neutral position, however the transmission can not be activated until the direction control lever 66 is moved to the neutral position. After the necessary checks are completed the powerup command is sent to module 93 which is the neutral state monitor. The transmission ratio remains zero until the operator moves the direction control lever 66 from the neutral position. The module 93 also ensures that the machine is in a state of "true" neutral at startup. The signal for "true" neutral can only be achieved when an input from the direction control lever 66 is received stating that the lever is in neutral and a signal is received stating the motor speed is zero. A signal is sent to the hystat controls 44, also shown as module 94, to the pump to stop the motor rotation and a signal is sent to the clutch control 28, also shown as module 95, to disengage all the clutches. These signals are sent only in the event that a "true" neutral is not present when the powerup state is reached. After all inputs are determined to be correct a signal indicating the machine is in neutral is sent to module 96 which interprets the operator requests.

Module 96 computes the operator intended transmission ratio as indicated by the position inputs from the speed pedal 62, the speed range lever 70, the direction control lever 66, current transmission ratio signal from a module 97 and an operator modified speed range gain from a range selector table 98 and a module 100 which is a speed range modifier. Module 97 receives three input signals, transmission output speed, motor speed and transmission input speed, and outputs a current transmission ratio to module 96 and three other modules as will be described later. Module 100 gives the operator the option of selecting the sensitivity of the speed range control mechanism 68 by changing the table entries in the range selector table 98. The table entries determine the speed range lever gains, which in turn controls the speed pedal 62 sensitivities. The range control mechanism 68 has four positions, each corresponding to different sensitivities for the speed pedal 62. The machine has a default value range selector table 98 which can be modified by the operator depressing the range increment button 72 or the range decrement button 74. Depressing both buttons 72, 74 simultaneously will return the table value to the default value. The table entry will be sent from module 100 to range selector table 98 which will send a speed range gain signal to the module 96. Module 96 will send a pedal gain signal to module 102 which is an underspeed and overspeed control.

A module 104 receives an engine throttle signal and computes a selected engine speed signal which is sent to a module 106. Module 106 receives the selected engine speed signal and the actual transmission input speed signal and computes the difference between the two incoming signals and passes the signal as an output to the module 102. Module 102 will modify the modify the operator generated machine speed request based upon the transmission input speed information from module 106, and send this modified request to module 108. Module 108 also receives a current transmission ratio signal from module 97. Module 108 compares the requested command signal with the maximum allowable rate of change, for the current transmission ratio from module 97, which are contained in table 110. The rates in table 110 are determined from the operator comfort and machine parameter perspective. If the operator inputs are not within a predetermine range of the rate tables module 108 will modify the signal to the maximum or minimum allowed value within the range, if the signal is within the range of the rate table 110 no modification is needed, and sends a rate limiting error signal to module 94 which controls the pump and motor.

A module 112 receives a current transmission ratio signal from module 97, a current clutch signal and sends a current mode signal to the module 94 and to a module 114 which is a clutch shift scheduler. Module 114 also receives a current transmission ratio signal from module 97, a shift point signal from a clutch shift data chart 116, a current clutch signal, a clutch slip signal from a module 120 which calculates clutch slips. Module 114 determines which clutch to disengage, which clutch to engage, which clutch needs to be filled in anticipation of engagement, determines when these operation need to be completed to ensure smooth clutch changes and send a signal to the clutch control module 95 to indicate exactly when to start clutch fill, start clutch disengagement or start clutch engagement.

The clutch slip module 120 receives a motor speed signal, a transmission output speed signal, a transmission input speed signal and calculates a clutch slip or relative speed signal. The clutch slip signal is sent to the pump/motor control module 94 and the clutch shift scheduler module 114.

Module 94 sends a target pump stroke signal to a module 122, which is the pump actuator, indicating when and how to stroke the pump and also sends a target motor stroke signal to a module 124, which is the motor actuator, indicating when and how to stroke the motor. The module 94 also sends a pump being stroked signal to a module 126 which holds the motor at a maximum stroke during pump stroke. Modules 122, 124 compute the actual numeric value that is output to the pump/motor swashplate actuating solenoids in response to the target signal supplied by module 94.

Module 95 interprets the inputs coming from module 114, which is the clutch shift scheduler, and sends a control code to a high reverse clutch actuation module 128, a high forward clutch actuation module 130, and a low clutch actuation module 132. Modules 128, 130 and 132 produce the actual numeric clutch actuation commands given to the control codes from module 95. The modules 128, 130 and 132 are programmed with the procedures to follow for clutch fill, clutch engagement and clutch disengagement.

A module 134, which is a default control, handles the machine operation in the event of a mechanical, hydraulic or electrical fault. The module 134 receives input from all sensors and fault information and sends signals to module 96, module 94 and module 95 to bring the machine into a more favorable state and restrict machine operation until the fault is corrected.

Referring to FIG. 3, an example and further defining a rate limiting method is shown at 140. Operator inputs, such as, speed pedal, directional lever and range selector switch are sent to the underspeed control 142. The underspeed control 142 also receives an engine condition signal 144 from a machine system 146. The underspeed control 142 compares the operator inputs signal 141 and the engine condition signal 144 to determine if the machine is capable of performing the operator request and sends a reference point signal to a rate limiting module 148. The rate limiting module 148 receives a current machine status signal 150 from the machine system 146. The reference point signal 147 and the current machine status signal 150 are compared to a predefined rate table module 152 and a maximum permissible error signal 154 is sent to the rate limiting module 148. The rate limiting module determines if the machine response can be carried out in respect to operator comfort and machine parameters and sends an error signal 156 to the machine transmission to perform the intended operator request.

Referring to FIG. 4, an example of a rate table is shown at 160. A portion 162 of the rate table is used when the machine is accelerating and another portion 164 is used when the machine is decelerating. When the percent of transmission ratio is at one range the maximum permissible rate is limited to that range. As the percent of transmission ratio changes the maximum permissible rate will change.

Figure 5:
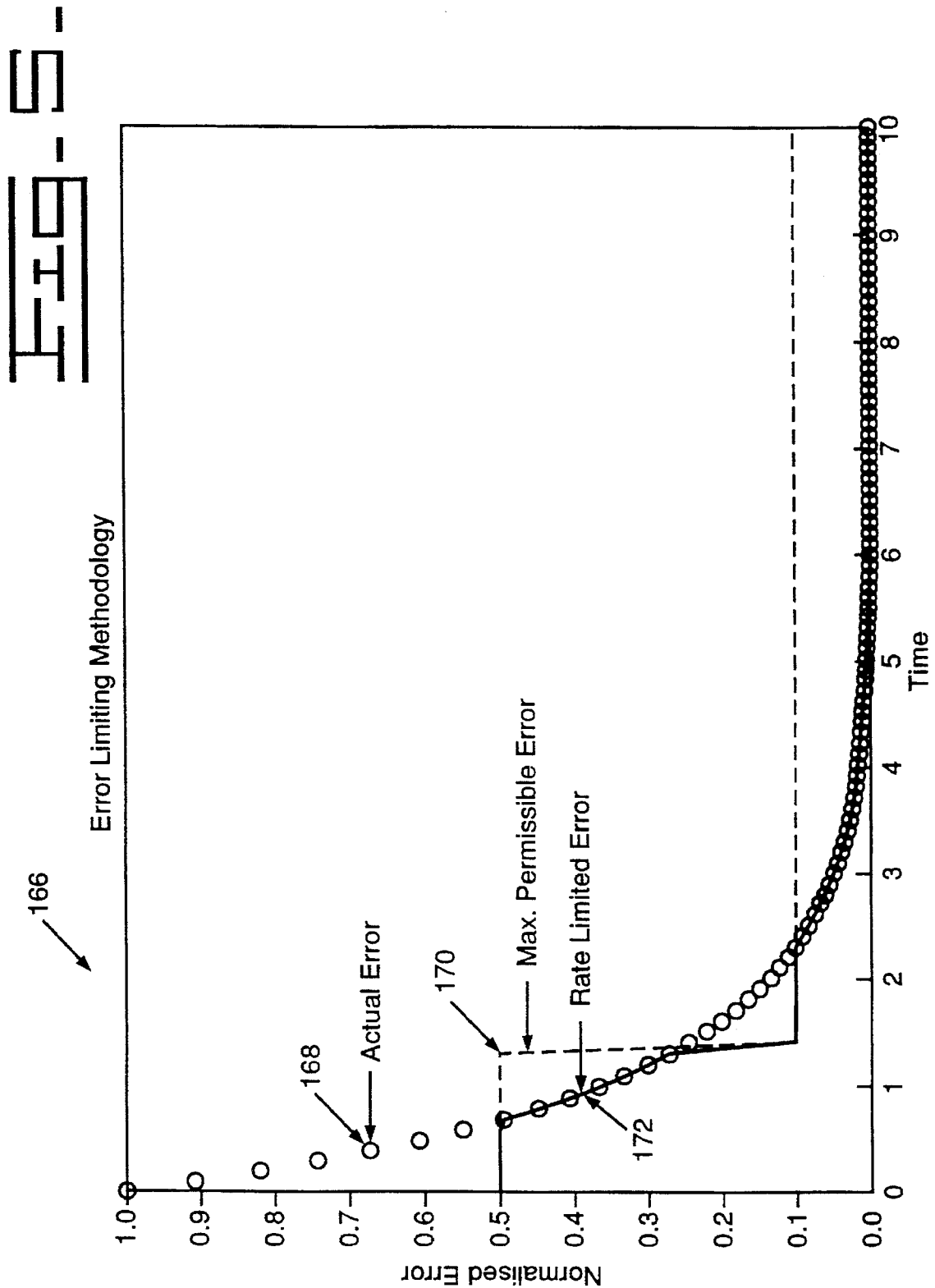
FIG. 5 is a graph showing the error limiting methodology.

Referring to FIG. 5, an error limiting graph 166 is shown. The actual error is shown by a series of circles 168. The maximum permissible error is shown by a dash line 170 and the rate limited error is shown by a solid line 172. The rate limited error 172 will follow the actual error 168 unless the actual error exceeds the maximum permissible error 170. When the actual error 168 exceeds the maximum permissible error 170 the rate limited error follows the maximum permissible error 170.

INDUSTRIAL APPLICABILITY

In operation of the subject embodiment, power is supplied to module 92, however power up is delayed until the self test is completed. When the self test is completed module 93 monitors the inputs and determines if the transmission is in neutral. with the transmission in neutral a signal is send to module 96 which allows the module to accept the operator inputs from the speed pedal 62, the directional lever 66, the range selector lever 70 and the current transmission ratio from module 97. Module 97 monitors the speed sensors 76, 78, 80 and computes the current transmission ratio which is sent to module 96. The directional control lever is moved to select a direction of travel. A signal is sent to the control module 102 indicating the operators intent. The control module 102 determines if the machine is capable of performing the intended request relative to engine speed and machine parameters and sends a signal to the rate limiting module. The rate limiting module will determine if the machine should perform the intended response relative to operator comfort, machine parameters and directs the appropriate signals to the hydrostatic control 44, 94 and the clutch control 28, 95. Initially, the hydrostatic transmission 16 increases the speed of the machine by adjusting the respective displacement of the variable displacement pump 48 and the variable displacement motor 52 and then controlling the respective speed clutches 36,38,40 to continue to increase the machine speed.

In view of the foregoing, it is readily apparent that the control of the continuously variable transmission will provide smooth and efficient operation of the transmission. The system monitors the system status and operator intended inputs and control the amount of power that is routed from the engine to the transmission.

We claim:

1. A method for controlling a continuously variable transmission having a hydrostatic transmission and a mechanical transmission drivingly connected to an engine, comprising the steps of:

monitoring the speed of the transmission input, the output speed of the hydrostatic transmission, the output speed of the mechanical transmission;

monitoring the position of a speed pedal, the position of a range selector lever, the position of a directional control lever;

comparing the monitored speeds and the position of the speed pedal, the range lever, the directional lever and developing a pedal gain signal and a engine underspeed signal for controlling the continuously variable transmission;

generating a reference point based upon the pedal gain signal and the engine underspeed signal to determine an unlimited error;

comparing the unlimited error to a predefined rate table to determine a maximum permissible error and develope a rate limited error signal; and controlling the continuously variable transmission in response to the rate limited error signal.

2. The method according to claim 1 wherein the step of determining the unlimited error signal a pedal gain signal is sent to a fuzzy logic controller.

* * * * *